United States Patent [19]

Bjorn et al.

[11] Patent Number: 6,122,737
[45] Date of Patent: Sep. 19, 2000

[54] METHOD FOR USING FINGERPRINTS TO DISTRIBUTE INFORMATION OVER A NETWORK

[75] Inventors: Vance Bjorn, San Carlos; Fabio Righi, Atherton, both of Calif.

[73] Assignee: Digital Persona, Inc., Redwood City, Calif.

[21] Appl. No.: 08/971,157

[22] Filed: Nov. 14, 1997

[51] Int. Cl.$^7$ ............................................. G06K 9/00
[52] U.S. Cl. ............................................. 713/186
[58] Field of Search ....................... 395/200.55; 382/116; 380/23, 30; 713/182, 186; 705/51

[56] References Cited

U.S. PATENT DOCUMENTS

| | | | |
|---|---|---|---|
| 3,419,287 | 12/1968 | Rudie | 283/7 |
| 3,872,438 | 3/1975 | Cuttill et al. | 340/700 |
| 3,959,884 | 6/1976 | Jordan et al. | 340/146.3 |
| 4,047,154 | 9/1977 | Vitols et al. | 340/146.3 |
| 4,151,512 | 4/1979 | Riganati et al. | 340/146.3 |
| 4,156,230 | 5/1979 | Riganati et al. | 340/146.3 |
| 4,185,270 | 1/1980 | Fischer, II et al. | 340/146.3 |
| 4,208,651 | 6/1980 | McMahon | 340/146.3 |
| 4,210,899 | 7/1980 | Swonger et al. | 340/146.3 |
| 4,225,850 | 9/1980 | Chang et al. | 340/146.3 |
| 4,253,086 | 2/1981 | Szwarcbier | 340/146.3 |
| 4,260,979 | 4/1981 | Smith | 340/146.3 |
| 4,414,684 | 11/1983 | Blonder | 382/4 |
| 4,449,189 | 5/1984 | Feix et al. | 364/513.5 |
| 4,454,610 | 6/1984 | Sziklai | 382/3 |
| 4,525,859 | 7/1985 | Bowles et al. | 382/5 |
| 4,581,760 | 4/1986 | Schiller et al. | 382/4 |
| 4,607,384 | 8/1986 | Brooks | 382/4 |
| 4,618,988 | 10/1986 | Schiller | 382/5 |
| 4,636,622 | 1/1987 | Clark | 235/380 |
| 4,641,350 | 2/1987 | Bunn | 382/4 |
| 4,646,352 | 2/1987 | Asai et al. | 382/5 |
| 4,685,145 | 8/1987 | Schiller | 382/52 |
| 4,696,046 | 9/1987 | Schiller | 382/5 |
| 4,698,751 | 10/1987 | Parvin | 364/200 |
| 4,723,298 | 2/1988 | Schiller | 382/56 |
| 4,747,147 | 5/1988 | Sparrow | 382/4 |
| 4,752,966 | 6/1988 | Schiller | 382/475 |
| 4,777,651 | 10/1988 | McCann et al. | 382/21 |
| 4,787,742 | 11/1988 | Schiller et al. | 356/71 |
| 4,790,564 | 12/1988 | Larcher et al. | 283/69 |
| 4,805,223 | 2/1989 | Denyer | 382/4 |
| 4,811,414 | 3/1989 | Fishbine et al. | 382/52 |
| 4,817,183 | 3/1989 | Sparrow | 382/4 |
| 4,827,527 | 5/1989 | Morita et al. | 382/4 |
| 4,837,843 | 6/1989 | Owechko | 382/31 |
| 4,876,726 | 10/1989 | Capello et al. | 382/4 |
| 4,891,503 | 1/1990 | Jewell | 235/380 |
| 4,896,363 | 1/1990 | Taylor et al. | 382/5 |
| 4,933,976 | 6/1990 | Fishbine et al. | 382/4 |
| 4,944,021 | 7/1990 | Hoshino et al. | 382/5 |
| 4,947,442 | 8/1990 | Tanaka et al. | 382/5 |
| 4,947,443 | 8/1990 | Costello | 382/5 |
| 4,956,870 | 9/1990 | Hara | 382/30 |
| 4,993,068 | 2/1991 | Piosenka et al. | 380/23 |
| 4,995,086 | 2/1991 | Lilley et al. | 382/4 |

(List continued on next page.)

FOREIGN PATENT DOCUMENTS

| | | | |
|---|---|---|---|
| 0159037 | 10/1985 | European Pat. Off. | G07C 9/00 |
| 4125198 | 5/1992 | Germany | G06K 19/073 |
| 5089234 | 8/1993 | Japan | G07D 9/00 |
| 1283748 | 8/1972 | United Kingdom | G07D 9/00 |
| 8203286 | 9/1982 | WIPO | G07C 11/00 |
| 9107728 | 5/1991 | WIPO | G06K 9/00 |

*Primary Examiner*—Tod R. Swann
*Assistant Examiner*—Matthew Smithers
*Attorney, Agent, or Firm*—Blakely, Sokoloff, Taylor & Zafman LLP

[57] ABSTRACT

A method, apparatus, and article of manufacture for distributing information from a provider to a user over a network. User fingerprint data is obtained from the user and transferred to the provider via the network. The provider injects the user fingerprint data into an information access program and transfers the information access program back to the user via the network. Direct user fingerprint data is then obtained from the user and compared to the injected user fingerprint data. If there is a match, the user is enabled to use the information access program.

27 Claims, 6 Drawing Sheets

U.S. PATENT DOCUMENTS

| | | | |
|---|---|---|---|
| 5,040,223 | 8/1991 | Kamiya et al. | 382/4 |
| 5,040,224 | 8/1991 | Hara | 382/4 |
| 5,050,220 | 9/1991 | Marsh et al. | 382/4 |
| 5,050,222 | 9/1991 | Lee | 382/21 |
| 5,053,608 | 10/1991 | Senanayake | 235/380 |
| 5,054,090 | 10/1991 | Knight et al. | 382/4 |
| 5,067,162 | 11/1991 | Driscoll, Jr. et al. | 382/5 |
| 5,095,194 | 3/1992 | Barbanell | 235/379 |
| 5,101,436 | 3/1992 | DeAguiar et al. | 382/1 |
| 5,105,467 | 4/1992 | Kim et al. | 382/4 |
| 5,109,428 | 4/1992 | Igaki et al. | 382/5 |
| 5,144,680 | 9/1992 | Kobayashi et al. | 382/4 |
| 5,175,593 | 12/1992 | Kumagai et al. | 356/71 |
| 5,187,747 | 2/1993 | Capello et al. | 382/4 |
| 5,187,748 | 2/1993 | Lee | 382/4 |
| 5,222,152 | 6/1993 | Fishbine et al. | 382/2 |
| 5,222,153 | 6/1993 | Beiswenger | 382/4 |
| 5,239,590 | 8/1993 | Yamamoto | 382/4 |
| 5,337,357 | 8/1994 | Chou et al. | 380/4 |
| 5,402,324 | 3/1995 | Yokoyama et al. | 362/19 |
| 5,416,573 | 5/1995 | Sartor | 356/71 |
| 5,448,649 | 9/1995 | Chen et al. | 382/126 |
| 5,448,659 | 9/1995 | Tsutsui et al. | 385/14 |
| 5,467,403 | 11/1995 | Fishbine et al. | 382/116 |
| 5,493,621 | 2/1996 | Matsumura | 382/125 |
| 5,509,070 | 4/1996 | Schull | 380/4 |
| 5,509,074 | 4/1996 | Choudhury et al. | 380/23 |
| 5,509,083 | 4/1996 | Abtahi et al. | 382/124 |
| 5,513,272 | 4/1996 | Bogosian, Jr. | 382/116 |
| 5,522,623 | 6/1996 | Soules et al. | 283/91 |
| 5,524,161 | 6/1996 | Omori et al. | 382/125 |
| 5,530,757 | 6/1996 | Krawcyzk | 380/23 |
| 5,541,994 | 7/1996 | Tomko et al. | 380/30 |
| 5,559,885 | 9/1996 | Drexler et al. | 380/23 |
| 5,563,345 | 10/1996 | Kersten et al. | 73/602 |
| 5,572,597 | 11/1996 | Chang et al. | 382/125 |
| 5,577,120 | 11/1996 | Penzias | 380/23 |
| 5,613,012 | 3/1997 | Hoffman et al. | 382/115 |
| 5,619,586 | 4/1997 | Sibbald | 382/127 |
| 5,623,552 | 4/1997 | Lane | 382/124 |
| 5,625,448 | 4/1997 | Ranalli et al. | 356/71 |
| 5,644,645 | 7/1997 | Osuga | 382/124 |
| 5,668,603 | 9/1997 | Copeland | 348/473 |
| 5,680,205 | 10/1997 | Borza | 356/71 |
| 5,887,140 | 3/1999 | Itsumi et al. | 395/200.55 |

METHOD FOR USING FINGERPRINTS TO DISTRIBUTE INFORMATION OVER A NETWORK

FIELD OF THE INVENTION

This invention relates generally to a fingerprint comparison system, and more particularly to a method for using fingerprints to distribute information over a network.

BACKGROUND OF THE INVENTION

Securing computer systems and electronic transactions is becoming more and more important as we enter the electronic age. Existing password and cryptographic techniques seem well on their way to solving the security problems of computer systems, electronic commerce, and electronic transactions. These solutions ensure that the set of digital identification keys associated with an individual person can safely carry on electronic transactions and information exchanges. Little, however, has been done to ensure that such identification keys can only be used by their legitimate owners. This is a critical link that needs to be made secure if secure computer access, electronic commerce, home banking, point of sale, electronic transactions, and similar mechanisms are to become truly secure.

Today, passwords handle most of these issues. For example, most electronic transactions, such as logging into computer systems, getting money out of automatic teller machines, processing debit cards, electronic banking, and similar transactions require passwords. Passwords are an imperfect solution because as more and more systems attempt to become secure, a user is required to memorize an ever expanding list of passwords. Additionally, passwords are relatively easily obtained by observing an individual when he or she is entering the password. Moreover, there is no guarantee that users will not communicate passwords to one another, lose passwords, or have them stolen. Thus, passwords are not considered sufficiently secure for many functions.

More and more often, fingerprint identification is considered. Fingerprints have the advantage of being unique to an individual person, requiring no memorization, and being relatively difficult to appropriate. Thus, some secure systems are switching to fingerprint recognition. Fingerprint recognition generally requires a user to place his or her finger on a fingerprint sensing device. Each fingerprint consists of a unique arrangement of ridges and grooves. The fingerprint sensing device transmits an analog image of the user's fingerprint, via a coaxial cable, to a computer system. The computer system then matches the fingerprint to a database of fingerprint templates in the computer system.

Public access information networks, such as the Internet, are being used to distribute a wide variety of information. However, public networks such as the Internet are not secure and there is a danger of information being copied or intentionally misrouted as it is being transmitted. Further, transmitted information, if it is protected at all, is usually protected by a traditional password scheme which is not able to verify that the person using the password is authorized to do so. Therefore, there is a need for a secure way to distribute information over a network which protects against possible information copying or misrouting and which can verify that only an authorized user can access the information.

SUMMARY OF THE INVENTION

The present invention provides a method, apparatus, and article of manufacture for distributing information from a provider to a user over a network. User fingerprint data is obtained from the user and transferred to the provider via the network. The provider injects the user fingerprint data into an information access program and transfers the information access program back to the user via the network. Direct user fingerprint data is then obtained from the user and compared to the injected user fingerprint data. If there is a match, the user is enabled to use the information access program.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF A PREFERRED EMBODIMENT OF THE PRESENT INVENTION

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. A preferred embodiment of the present invention, described below, enables a remote computer system user to execute a software application on a network file server.

In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

In one embodiment, steps according to the present invention are embodied in machine-executable software instructions, and the present invention is carried out in a processing system by a processor executing the instructions, as will be described in greater detail below. In other embodiments, hardwired circuitry may be used in place of, or in combination with, software instructions to implement the present invention.

Hardware Environment

Figure 1:
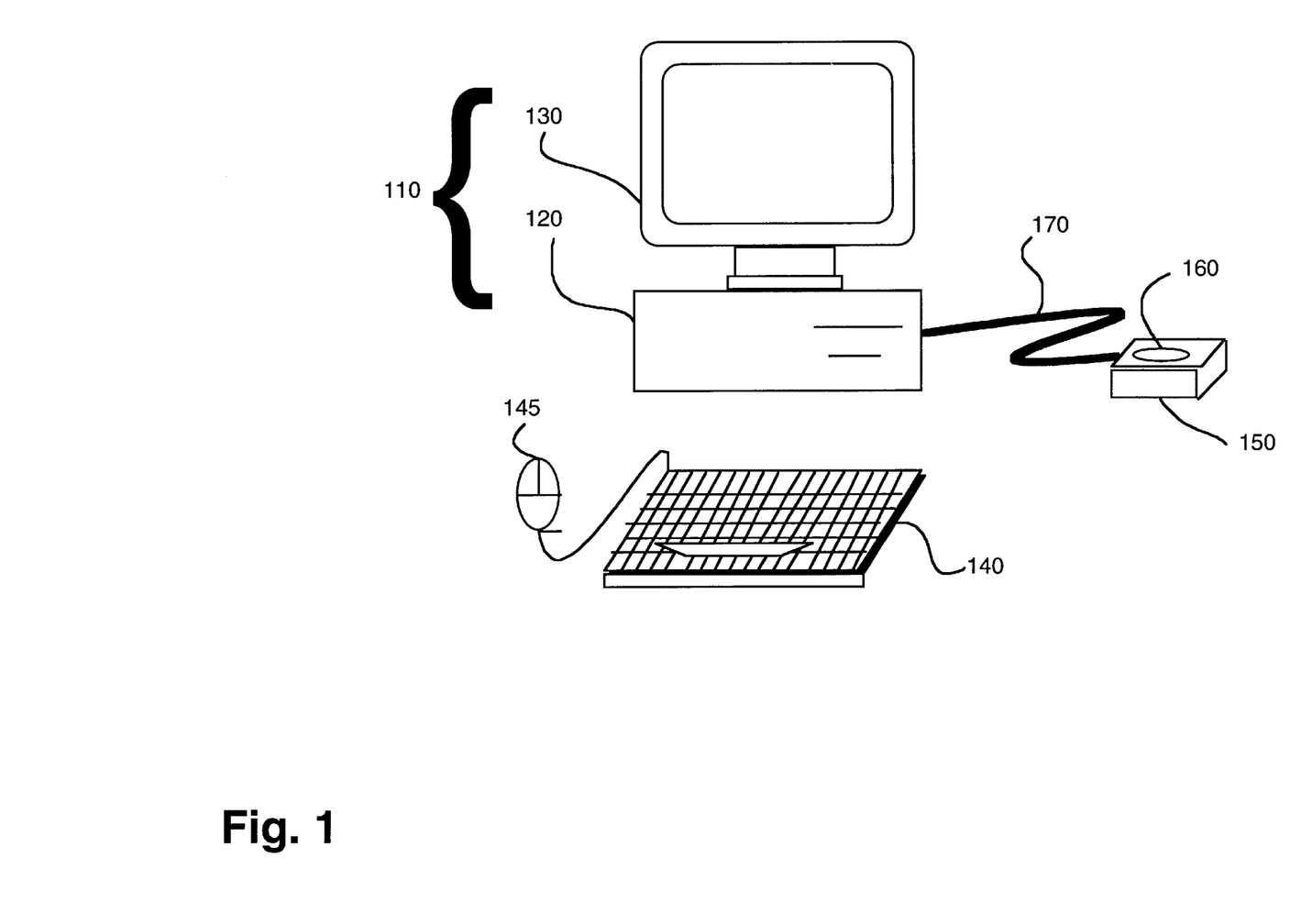
FIG. 1 is an overview level diagram of a sample system compatible with the present invention.

FIG. 1 illustrates an overview level diagram of a sample system in which one embodiment of the present invention may be implemented. A digital system 110 is a computing system which has the processing ability to compare a received digitized image with a database of digitized templates, and control a digital connection for receiving the digitized image. In the preferred embodiment, the digital connection is a data bus which conforms to a universal serial bus (USB) standard, as is well known to those of ordinary skill in the art. In FIG. 1, digital system 110 is represented as a computer system. The computer system 110 includes a body 120, which contains the processing power of the computer system 110. Computer system 110 also includes a display 130. The display 130 may be a liquid crystal display (LCD), cathode ray tube (CRT), or similar display mechanism. Computer system 110 includes a data entry mechanism 140. In this instance, a keyboard 140 is illustrated. The keyboard 140 permits a user to interact with the computer system 110. A conventional cursor control device 145 is further illustrated. The cursor control device 145 may be a mouse, trackball, pen, or similar device.

In one embodiment, sensor 150 is coupled to the computer system 110 via a cable 170. Alternatively, sensor 150 may be coupled to computer system 110 via an infrared, radio frequency, modem, network, or any other direct or indirect digital connection.

The sensor 150 of the present invention includes a sensor platen 160, on which a finger is placed for the fingerprint recognition. In one embodiment, cable 170 is a universal serial bus (USB) connection. It will be apparent to those of ordinary skill in the art that other digital connections may also be used. The sensor 150 may further have a connection to a power source. However, if the cable 170 is a USB connection, no such additional power connection is required as the USB connection provides power. It is to be understood that FIG. 1 is merely an illustration of one embodiment of a system on which the present invention may be practiced. Alternate configurations, such as a portable computer 110, a digital system which does not have all of the components illustrated, or a sensor 150 having a different shape or size may also be utilized.

Figure 2:
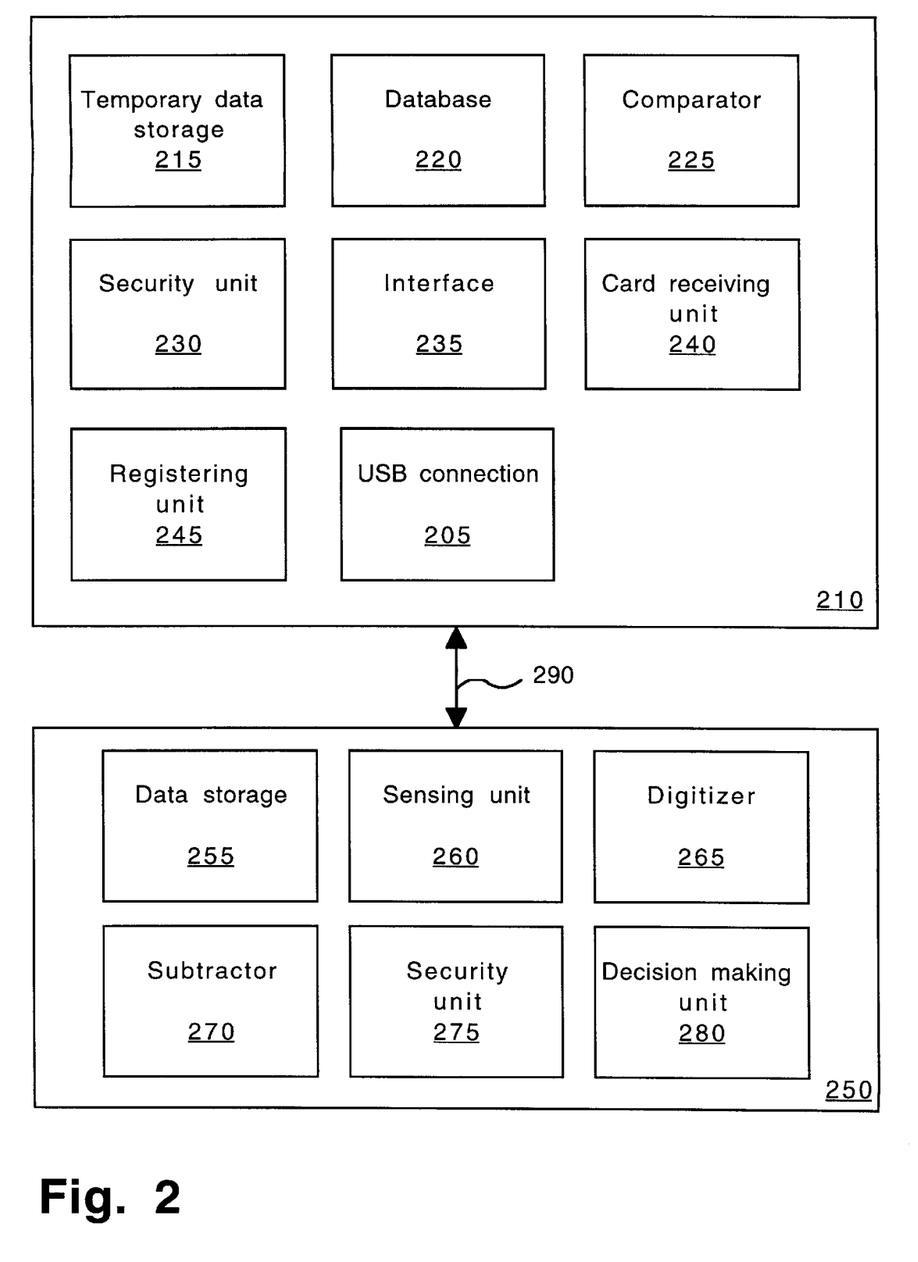
FIG. 2 is a functional block diagram of a digital processing system and a sensor compatible with the present invention.

FIG. 2 is a functional block diagram of the digital system 210 and sensor 250 of the present invention. In one embodiment, the digital system 210 may be embodied in a computer system 110. The digital system 210 includes a temporary data storage 215, for storing data temporarily. The temporary data storage 215 may include random access memory (RAM), and various registers. Digital system 210 further includes database 220. Database 220 is for storing fingerprint templates, identification data, etc. for each individual person who is registered with that system. Comparator 225 is for comparing fingerprint data. In one embodiment, the comparator 225 is able to compare data stored in the database 220 with data stored in the temporary data storage 215. The comparator 225 has an output which determines whether or not the data provided to it match or not.

Security unit 230 is utilized to encrypt and decrypt messages sent between the digital system 210 and the sensor 250 on line 290 and to determine, maintain and use session keys. Security unit 250 is further described below. An interface 235 interacts with the user and with other programs in the digital system 210 and the sensor 250. Interface 235 may display various windows in a WINDOWS or MACINTOSH environment. Windows is a trademark of Microsoft Corporation, and Macintosh is a trademark of Apple Computers, Inc.

Card receiving unit 240 may be integral with digital system 210, or it may be attached to digital system 210 via a bus, cable, infrared, or other connection method. Card receiving unit 240 is for receiving a token, smart card, barcode, diskette, or similar medium which may store personal information about the holder of the card, and may contain fingerprint information. The card receiving unit 240 may be utilized to verify the identity of the card holder with respect to fingerprint information stored on the card.

Registering unit 245 enables a user to register with the digital system 210, such that the user's fingerprint identification is placed in the database 220. The digital system 210 may further include a universal serial bus (USB) controller 205. The universal serial bus controller 205 couples the digital system 210 with the sensor 250, in one embodiment. Universal serial bus controller 205 provides a data conduit as well as power to sensor 250. The functioning of the universal serial bus controller 205 may be found in more detail in the Universal Serial Bus Specification, Revision 1.0, Jan. 15, 1996.

Sensor 250 is coupled to the digital system 210 through connection 290. In one embodiment, the connection 290 is USB, which provides both data and power connections. Alternatively, sensor 250 may have a separate power connection.

Sensor 250 includes a data storage unit 255. Data storage unit 255 may include RAM, registers, as well as memory. Data storage unit 255 stores intermediate values of prints, templates, sums, session keys, permanent sensor signature, and similar data.

Sensor 250 further includes a sensing mechanism 260. The sensing mechanism 260 may include a sensor platen, on which a user can place his or her fingers for recognition. The sensing mechanism 260 may be a conventional fingerprint sensing mechanism, consisting of a light, illuminating at least one prism, which reflects the print on the sensor platen. The reflected print is received by a detector array. Alternatively, sensing mechanism 260 may utilize other methods of sensing, including capacitive sensors.

Sensor 250 further includes a digitizer 265. Digitizer 265 digitizes images received from the sensing mechanism 260. Mechanisms which may be used to digitize an image are known in the art. In one embodiment, a conventional analog-to-digital converter is utilized.

Sensor 250 further includes a subtractor 270. Subtractor 270 is utilized to filter a digitized fingerprint image and subtract a background image from a print, as will be described below.

Security unit 275 in the sensor 250 corresponds to the security unit 230 in the digital system 210. However, it may further store the private key of the sensor, its signature, in a tamper-proof environment.

Finally, sensor 250 includes decision making unit 280. Decision making unit 280 may be utilized to make a final determination whether a fingerprint matches the print in the database 220. Decision making unit 280 may be used when digital system 210 is not secure, and strict security is necessary. The functioning of the above described components is elaborated further below.

In one embodiment, digital system 210 may be a computer system, a PCMCIA card, a portable computer, a network station and server, a palm top computer, or any other system which may be capable of processing the data required. Furthermore, the sensor 250 may be located within the digital system 210. In such a case, no duplicative memory, security units and USB controller would be required.

Figure 3:
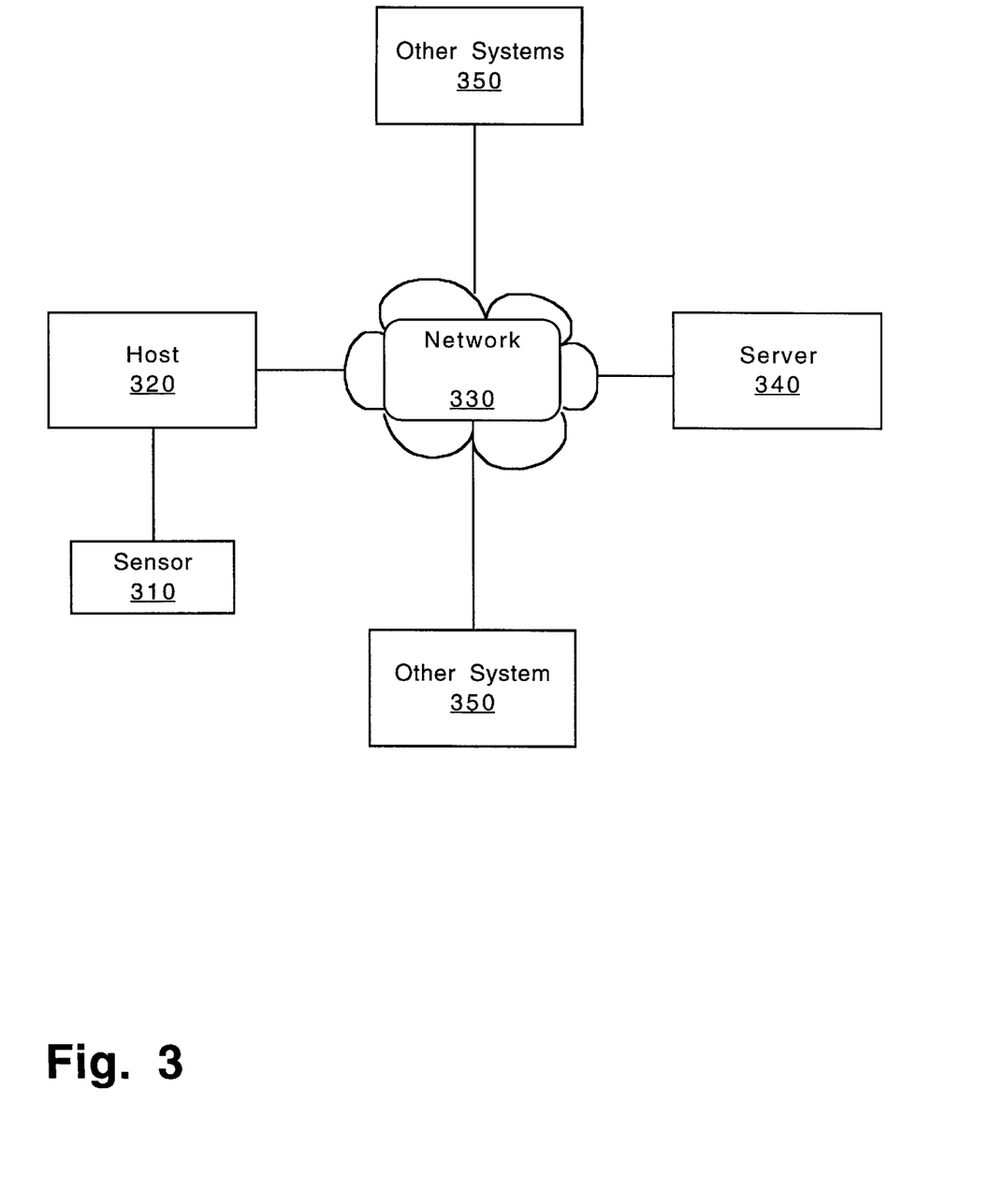
FIG. 3 is a functional block diagram of one embodiment of a networked sensor and server compatible with the present invention.

FIG. 3 illustrates a network in which the present invention may be utilized. Sensor 310 is coupled to host 320. Host 320 is enabled to connect to a network 330, which couples a plurality of systems 320, 340, 350 together. A server 340 contains the database which is matched to the fingerprint received by sensor 310. Other systems 350 may be utilized for their processing power. Thus, the actual fingerprint recognition process may be distributed over a plurality of systems 320, 340, 350. Such a distributed processing may be used for accessing remote data through a network. Because neither the server 340, nor the other systems 350 are secure, for security purposes final matching may be done in the sensor 310. This would be accomplished by sending the processed data back to the sensor 310. Thus, the sensor 310 receives matched elements, and the original fingerprint. Verifying that the matched elements truly match the original fingerprint is a process which may be accomplished in the sensor 310. Thus, the sensor 310 may send out the final matched/not matched signal, thus creating a secure system over an insecure network 330.

Figure 4:
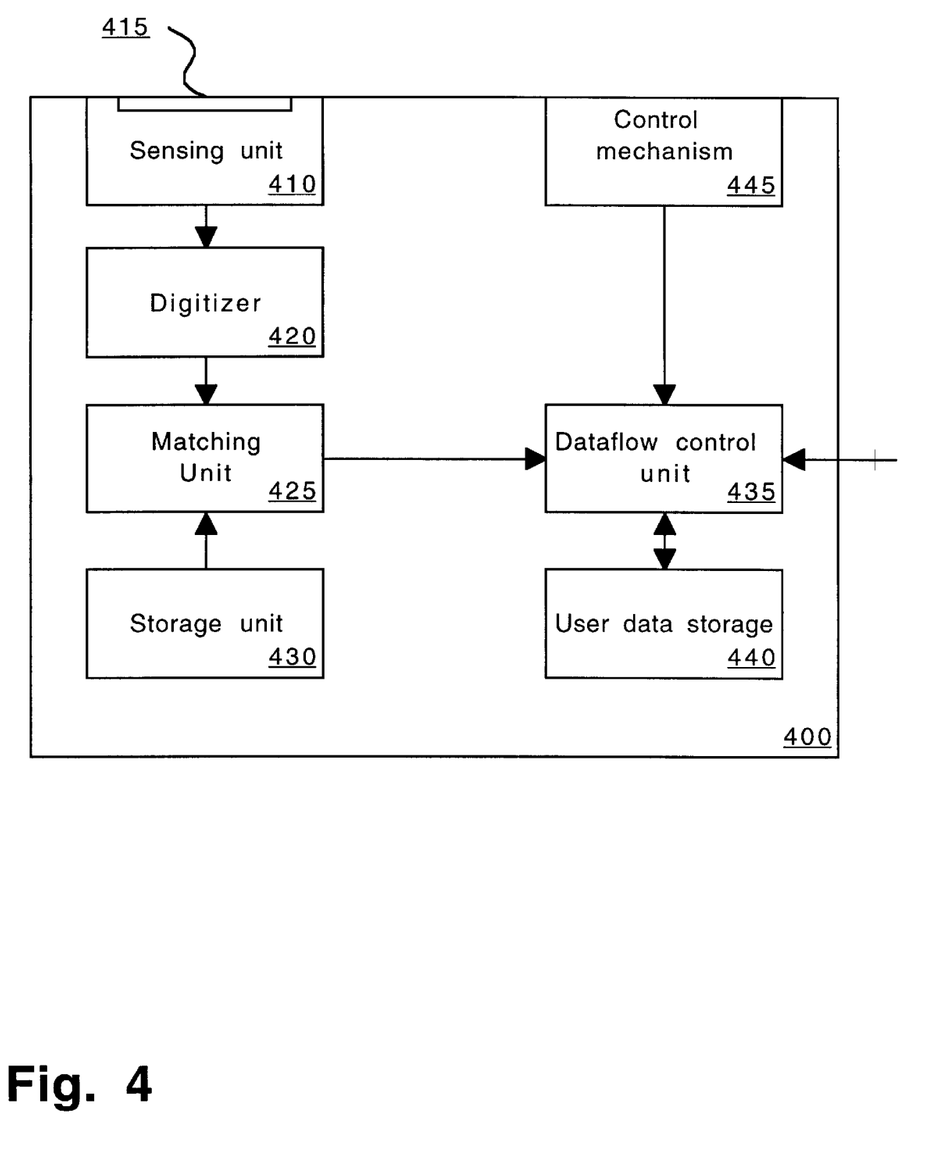
FIG. 4 is a functional block diagram of one embodiment of a wallet compatible with the present invention.

FIG. 4 illustrates a block diagram of one embodiment of a system which combines the functionality of the sensor 250 and digital system 210 into a single unit, called a wallet 400. A wallet 400 may be implemented with different configurations of software and hardware. For example, the entire wallet 400 may reside in a smart card, or it may be implemented as a distributed system that may include a smart card, database, and matching/control software distributed over a network.

Sensing unit 410 has a sensor platen 415 on which a finger is placed. Sensing unit 410 receives the image, and passes it on to digitizer 420. Digitizer 420 digitizes the fingerprint image, and passes it on to a matching unit 425. Matching unit 425 further has access to a storage unit 430, which stores a database of templates. Matching unit 425 matches the features of the received fingerprint, to the templates in the storage unit 430. In one embodiment, such a wallet 400 belongs to one individual only, whose print is stored in the storage unit 430. The matching unit 425 passes on a yes/no decision, whether prints match, to a data flow control unit 435. The data flow control unit 435 controls access to data stored in a user data unit 440. The data flow control unit 435 may further allow the user to upload information to the wallet 400 once the user's access to the wallet 400 is verified.

The user data unit 440 may contain such information as the user's credit card number, social security number, and identity. The user data unit 440 may further contain any information a user wishes to store in the user data unit 440. The wallet 400 further may include a control mechanism 445, such as a keyboard, mouse, trackball, touch pad, etc. The user may utilize the control mechanism 445 to add data to the wallet 400.

Figure 5:
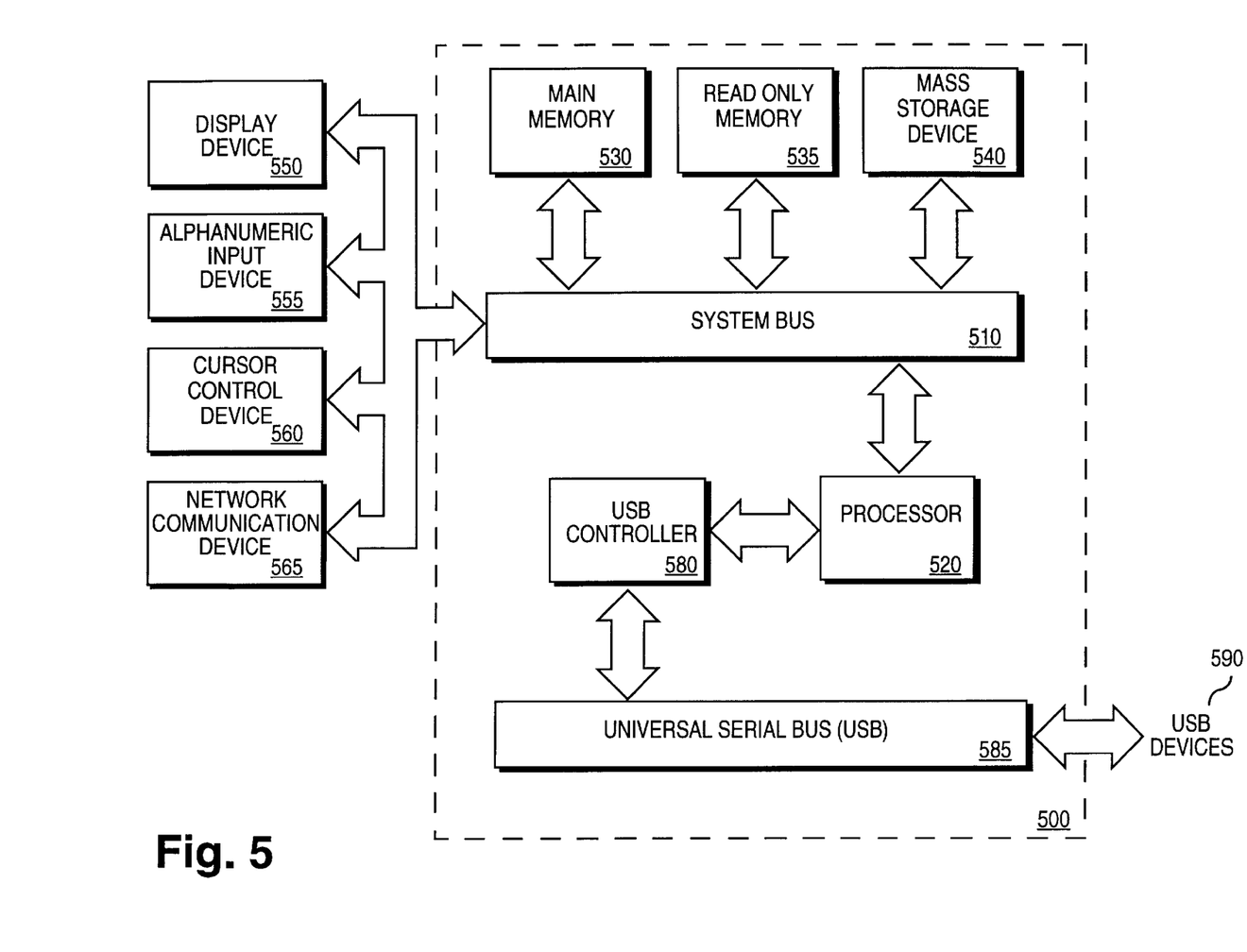
FIG. 5 is a diagram of one embodiment of a digital system compatible with the present invention.

FIG. 5 is a diagram of one embodiment of the digital system of the present invention. Digital system 500 comprises a system bus 510 or other communication means for communicating information, and a processor 520 coupled with system bus 510 for processing information. Digital system 500 also comprises a read only memory (ROM) and/or other static storage device 535 coupled to system bus 510 for storing static information and instructions for processor 520. The digital system 500 further comprises a main memory 530, a dynamic storage device for storing information and instructions to be executed. Main memory 530 also may be used for storing temporary variables or other intermediate information during execution of instructions. In one embodiment the main memory 530 is dynamic random access memory (DRAM).

Digital system 500 further comprises a universal serial bus (USB) controller 580, a bus controller for controlling a universal serial bus (USB) 585. The USB 585 is for coupling USB devices 590 to the digital system 500. The sensor 250 may be one of the USB devices 590 coupled to the digital system 500 via the USB 585.

Digital system 500 can also be coupled via system bus 510 to a display device 550, such as a cathode ray tube (CRT) or liquid crystal display (LCD) screen, for displaying information to a user. An alphanumeric input device 555 is typically coupled to system bus 510 for communicating information and command selections to processor 520. Another type of user input device is cursor control device 560, such as a mouse, a trackball, trackpad, or cursor direction keys for communicating direction information and command selections to processor 520 and for controlling cursor movement on display device 550. Alternatively, other input devices such as a stylus or pen can be used to interact with the display. The digital system 500 may further be coupled via the system bus 510 to a network communication device 565. The network communication device 565 may be utilized to couple the digital system to other digital systems, servers, and networks.

Software Environment

The present invention provides for the use of a fingerprint to insure data integrity, data authenticity, and user verification when distributing information over a network. The present invention may be used with any type of digital information, including, but not limited to, software programs, sound or recorded music files, photographs, movies, books, documents, or any other type of digital record. The present invention may be used when information or software is sold to a user by a provider, or in other noncommercial situations such as a taxpayer viewing their social security records through the federal government.

Figure 6:
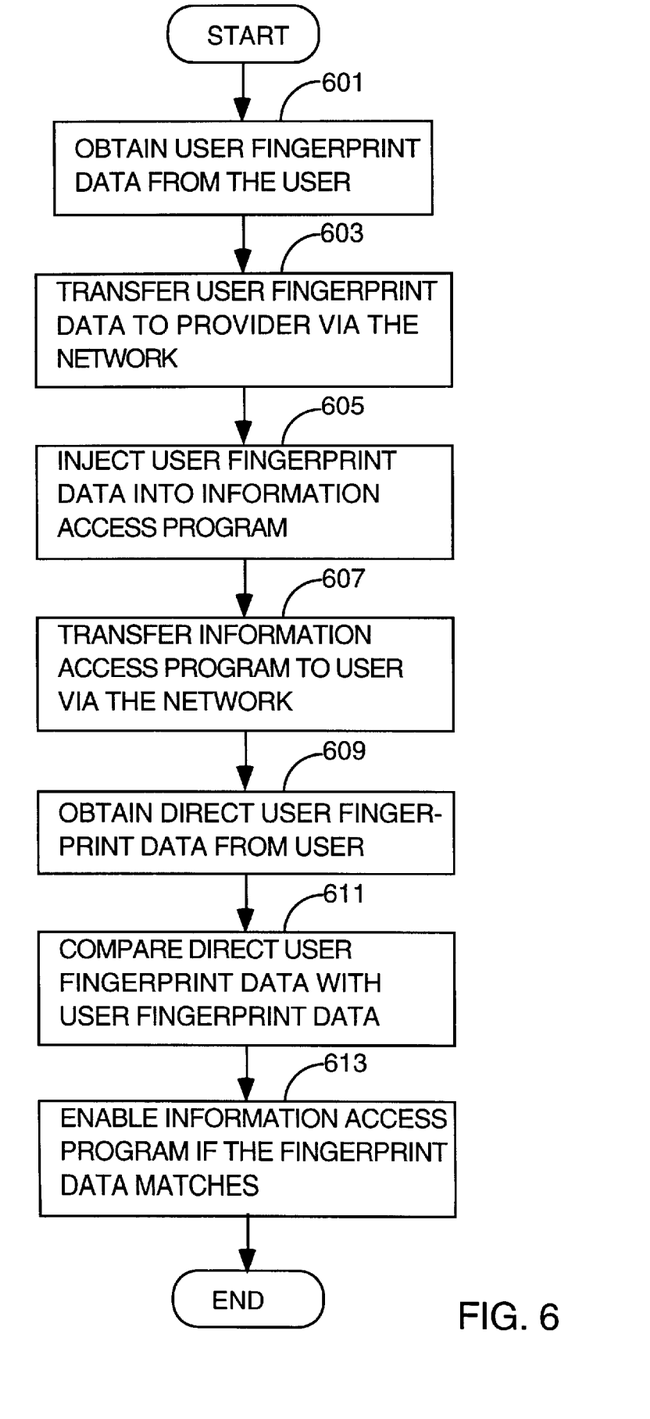
FIG. 6 is a flowchart of a method for using fingerprints to distribute information over a network compatible with the present invention.

A flowchart of a preferred method to distribute digital information over a network is shown in FIG. 6. At step 601, user fingerprint data is obtained from the user. Typically this is provided directly by the user through the sensor 150, 250. However, it will be recognized by one of ordinary skill in the art that user fingerprint data may be provided to the present invention by many means other than the sensor 150, 250, such as by an encoded smart card, or by a virtual address book which stores one or more fingerprints in a file on the computer system 110. At step 603, the user fingerprint data is sent to the information provider via the network. To provide additional security, the user fingerprint data may optionally be encrypted by the computer system 110 with an encryption key previously distributed to the user by the provider. In one embodiment of the present invention, the user fingerprint data may be used as a cryptographic key. The concurrently filed application entitled "Cryptographic Key Generation Using Biometric Data", Ser. No. 08/970,304, filed Nov. 14, 1997, which teaches a method of generating a cryptographic key based on a fingerprint, is incorporated herein by reference.

At step 605, the user fingerprint data is injected into an information access program. The information access program may be one of many different types of digital files, such as a software installation program, a software application program, a program for encrypting or decrypting information, or a data file such as a sound or recorded music file, a photograph, a movie, or any other type of digital record. It will be recognized by one of ordinary skill in the art that the step of injecting the user fingerprint data into the information access program may differ depending on the type of information access file without loss of generality with the present invention. For example, a software installation program may have the user fingerprint data inserted into a fixed area of the program. In another example using a data file, the user fingerprint data may be encoded in a digital picture through the low-order bit of a group of pixels.

At step 607, the information access program is transferred back to the user via the network. Once the user has received the information access program, the user preferably runs the program from the computer system 110. At step 609, the user is prompted to provide direct user fingerprint data, preferably through the use of the sensor 150, 250. While direct fingerprint data may be requested once in the case of a software installation program, it may also be required many times, for viewing a photograph when a user uses an access program to view many digital photographs.

In one embodiment of the present invention, if software or data is being rented or otherwise provided on demand over the network, a timestamp or other tracking information may be encoded with the injected user fingerprint data. The tracking information may be used to control the number of times the software or data can be accessed by only prompting the user for the direct fingerprint data while user is authorized to access the information.

At step 611, the information access program compares the direct user fingerprint data with the previously injected user fingerprint data. At step 613, if the direct user fingerprint data matches that of the injected user fingerprint data, the information access program is enabled to allow the user to access the information. In the case where the information access program is a software installation program, the program will proceed to install the software on the user's system. In the case where the information access program is a software installation program or a data file, the program decompresses or unencrypts the installation program or data file so it may be viewed, heard, or otherwise used or experienced by the user. It will be noted by one of ordinary skill in the art that a wide variety of other enablement techniques may be used with the present invention without loss of generality.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A method for distributing information from a provider to a user over a network comprising:
    transferring first user fingerprint data to the provider via the network;
    injecting the first user fingerprint data into an information access program of the provider; and
    transferring the information access program including the injected first user fingerprint data to the user via the network.

2. The method of claim 1 further comprising:
    obtaining direct user fingerprint data from the user;
    comparing the direct user fingerprint data with the previously injected first user fingerprint data; and
    enabling the information access program to access information if there is a match between the direct user fingerprint data and the previously injected first user fingerprint data.

3. The method of claim 2 wherein said obtaining of direct user fingerprint data comprises obtaining a live fingerprint from the user.

4. The method of claim 2 wherein said obtaining of direct user fingerprint data comprises obtaining fingerprint data from a virtual address book.

5. The method of claim 2 wherein said obtaining of direct user fingerprint data comprises obtaining fingerprint data from a smart card.

6. The method of claim 2 wherein said enabling of the information access program to access information comprises decrypting the information access program previously encrypted with the injected user fingerprint data as a cryptographic key.

7. The method of claim 2 further comprising:
    transferring second user fingerprint data to the provider via the network; and
    injecting the second user fingerprint data into the information access program.

8. The method of claim 7 further comprising:
    comparing the direct user fingerprint data with the previously injected first and second user fingerprint data; and
    enabling the information access program to access information if there is a match between the direct user fingerprint data and the previously injected second user fingerprint data.

9. The method of claim 1 further comprising:
    encrypting a data file using the first user fingerprint data as a cryptographic key;
    injecting the first user fingerprint data into the data file; and
    transferring the data file to the user via the network.

10. An apparatus for distributing information from a provider to a user over a network, the apparatus comprising:
    a digital computer having input means for allowing the entering of first user fingerprint data;
    means coupled to the network and the digital computer for transferring first user fingerprint data to the provider via the network;
    means coupled to the network for injecting the first user fingerprint data into an information access program of the provider; and
    means coupled to the network for transferring the information access program including the injected first user fingerprint data to the user via the network.

11. The apparatus of claim 10 further comprising:
    means operated by the digital computer for obtaining direct user fingerprint data from the user;
    means operated by the digital computer for comparing the direct user fingerprint data with the previously injected first user fingerprint data; and
    means operated by the digital computer for enabling the information access program to access information if there is a match between the direct user fingerprint data and the previously injected first user fingerprint data.

12. The apparatus of claim 11 wherein the means operated by the digital computer for obtaining direct user fingerprint data comprises means for obtaining a live fingerprint from the user.

13. The apparatus of claim 11 wherein the means operated by the digital computer for obtaining direct user fingerprint data comprises means for obtaining fingerprint data from a virtual address book.

14. The apparatus of claim 11 wherein the means operated by the digital computer for obtaining direct user fingerprint data comprises means for obtaining fingerprint data from a smart card.

15. The apparatus of claim 11 wherein the means operated by the digital computer for enabling the information access program to access information comprises means for decrypting the information access program previously encrypted with the injected user fingerprint data as a cryptographic key.

16. The apparatus of claim 11 further comprising:
    means operated by the digital computer for transferring second user fingerprint data to the provider via the network; and means coupled to the network for injecting the second user fingerprint data into the information access program.

17. The apparatus of claim 16 further comprising:

means operated by the digital computer for comparing the direct user fingerprint data with the previously injected first and second user fingerprint data: and means operated by the digital computer for enabling the information access program to access information if there is a match between the direct user fingerprint data and the previously injected second user fingerprint data.

18. The apparatus of claim 10 further comprising:

means coupled to the network for encrypting a data file using the first user fingerprint data as a cryptographic key;

means coupled to the network for injecting the first user fingerprint data into the data file; and means coupled to the network for transferring the data file to the user via the network.

19. An article of manufacture for use in a computer system for distributing information from a provider to a user over a network, the computer having a keyboard, pointing device, visual display, and data storage device, the article of manufacture comprising a computer usable medium having computer readable program code means embodied in the medium, the program code means including:

computer readable program code means embodied in the computer usable medium for causing a computer to transfer first user fingerprint data to the provider via the network;

computer readable program code means embodied in the computer usable medium for causing a computer to inject the first user fingerprint data into an information access program of the provider; and computer readable program code means embodied in the computer usable medium for causing a computer to transfer the information access program including the injected first user fingerprint data to the user via the network.

20. The article of manufacture of claim 19 further comprising:

computer readable program code means embodied in the computer usable medium for causing a computer to obtain direct user fingerprint data from the user;

computer readable program code means embodied in the computer usable medium for causing a computer to compare the direct user fingerprint data with the previously injected first user fingerprint data; and computer readable program code means embodied in the computer usable medium for causing a computer to enable the information access program to access information if there is a match between the direct user fingerprint data and the previously injected first user fingerprint data.

21. The article of manufacture of claim 20 wherein the means for causing a computer to obtain direct user fingerprint data comprises means embodied in the computer usable medium for causing a computer to obtain a live fingerprint from the user.

22. The article of manufacture of claim 20 wherein the means for causing a computer to obtain direct user fingerprint data comprises means embodied in the computer usable medium for causing a computer to obtain fingerprint data from a virtual address book.

23. The article of manufacture of claim 20 wherein the means for causing a computer to obtain direct user fingerprint data comprises means embodied in the computer usable medium for causing a computer to obtain fingerprint data from a smart card.

24. The article of manufacture of claim 20 wherein the means for causing a computer to enable the information access program to access information comprises means embodied in the computer usable medium for causing a computer to decrypt the information access program previously encrypted with the injected user fingerprint data as a cryptographic key.

25. The article of manufacture of claim 20 further comprising:

means embodied in the computer usable medium for causing a computer to transfer second user fingerprint data to the provider via the network; and means embodied in the computer usable medium for causing a computer to inject the second user fingerprint data into the information access program.

26. The article of manufacture of claim 25 further comprising:

means embodied in the computer usable medium for causing a computer to compare the direct user fingerprint data with the previously injected first and second user fingerprint data; and means embodied in the computer usable medium for causing a computer to enable the information access program to access information if there is a match between the direct user fingerprint data and the previously injected second user fingerprint data.

27. The article of manufacture of claim 19 further comprising:

means embodied in the computer usable medium for causing a computer to encrypt a data file using the user fingerprint data as a cryptographic key;

means embodied in the computer usable medium for causing a computer to inject the user fingerprint data into the data file; and means embodied in the computer usable medium for causing a computer to transfer the data file to the user via the network.

* * * * *